United States Patent [19]

Estes et al.

[11] 4,160,011

[45] Jul. 3, 1979

[54] CRYSTALLINE ALUMINOSILICATE PERCURSOR

[75] Inventors: John H. Estes, Wappingers Falls; Stanley Kravitz, Fishkill; Robert M. Suggitt, Wappingers Falls, all of N.Y.

[73] Assignee: Texaco Inc., New York, N.Y.

[21] Appl. No.: 865,452

[22] Filed: Dec. 29, 1977

Related U.S. Application Data

[63] Continuation-in-part of Ser. No. 536,711, Dec. 26, 1974, abandoned, which is a continuation-in-part of Ser. No. 272,089, Jul. 14, 1972, abandoned.

[51] Int. Cl.² .............................................. C01B 33/28
[52] U.S. Cl. ..................................... 423/328; 423/329
[58] Field of Search ............................... 423/328–330, 423/118; 252/455 Z; 106/288 B

[56] References Cited

U.S. PATENT DOCUMENTS

| | | | |
|---|---|---|---|
| 2,847,280 | 8/1958 | Estes | 423/329 |
| 2,979,381 | 4/1961 | Gottstine et al. | 423/329 |
| 3,130,007 | 4/1964 | Breck | 423/328 |
| 3,481,699 | 12/1969 | Domine et al. | 423/330 |

OTHER PUBLICATIONS

Barrer et al., "J. Chem. Soc.", 1952, pp. 1561–1571.
Iler, "The Colloid Chemistry of Silica and Silicates", 1955, p. 143.

*Primary Examiner*—Edward J. Meros
*Attorney, Agent, or Firm*—Thomas H. Whaley; Carl G. Ries; William E. McNulty

[57] ABSTRACT

An amorphous powder useful as a precursor for the preparation of crystalline aluminosilicates is prepared by forming a sodium aluminum silicate water mixture whose composition falls within specified ranges for forming sodium zeolite A. By dehydrating the mixture with a water miscible solvent prior to aging and crystal formation, an amorphous powder is recovered for future use. Upon subsequent treatment the amorphous powder can be converted to crystalline aluminosilicates including type 3A, 4A, 5A, X and Y.

17 Claims, No Drawings

CRYSTALLINE ALUMINOSILICATE PERCURSOR

CROSS-REFERENCES TO RELATED APPLICATIONS

This is a continuation-in-part of Application Ser. No. 536,711 filed Dec. 26, 1974, now abandoned, which is a continuation-in-part of Application Ser. No. 272,089 filed July 14, 1972, now abandoned.

BACKGROUND OF THE INVENTION

This invention relates to crystalline aluminosilicates. In particular, it relates to methods of preparing crystalline aluminosilicates and especially improved preparation methods which include the preparation of a crystalline aluminosilicate precursor which may be stored and utilized subsequently for the preparation of crystalline aluminosilicates.

Synthetic crystalline aluminosilicates constitute well known materials which have heretofore been employed as selective absorbents, carriers and catalysts. In general such crystalline materials have been grown under designated conditions of temperature and time from alkali oxide, aluminum oxide, silica and water precursors. The simplest source materials for preparing the more common crystalline aluminosilicates, the type A, X and Y zeolites, are sodium aluminate, sodium silicate and for the more siliceous X and Y types an additional source of $SiO_4^{-4}$ ions. (The terms crystalline aluminosilicates and zeolites are used herein interchangably and refer to the same crystalline materials.) Most of the synthesis procedures now in use are tailored to the specific zeolite being prepared. During the course of preparation a wet gel is produced which is often susceptible to nucleation by unwanted species in the preparation mixture. In many instances this obviates the storage of the wet gel. In one such preparation process described and claimed in U.S. Pat. No. 2,847,280, a type 4A zeolite is prepared by forming a mixture of hydrous silica and by-product sodium salt by reacting an aqueous solution of sodium silicate with a substance selected from the group consisting of $CO_2$, $SO_2$, $H_2S$, the sodium hydrogen salts of their corresponding acids and mixtures of the same; adding sodium aluminate to said mixture in an amount sufficient to establish the proportions of aluminum and silicon in the resultant mixture essentially stoichiometric for the formation of zeolite A; aging the resultant mixture for between 8 and 170 hours at a temperature not substantially above about 100° F. thereafter maintaining the aged mixture under autogenous pressure at a temperature of 150°–325° F. for at least about three hours; and recovering the hydrated sodium aluminosilicate as the resultant solid fraction in crystalline form.

Another process for preparing a 4A zeolite is described and claimed in U.S. Pat. No. 2,882,243. This process comprises preparing an aqueous solution of oxides within specified ranges of their mole ratios, or of materials whose chemical compositions can be completely represented as mixtures of the oxides, $Na_2O$, $Al_2O_3$, $SiO_2$, and $H_2O$. The mixture is maintained at a temperature of about 100° C. for periods ranging from fifteen minutes to ninety hours or longer to yield the crystallized product, sodium zeolite A.

The composition of the crystalline zeolites of significant interest are set forth below;

| TYPE OF ZEOLITE | CHEMICAL ANALYSIS |
|---|---|
| A | $Na_2O \cdot Al_2O_3 \cdot 2SiO_2 \cdot 4.5H_2O$ |
| X | $Na_2O \cdot Al_2O_3 \cdot 2.5 SiO_2 \cdot 6H_2O$ |
| Y | $Na_2O \cdot Al_2O_3 \cdot 5 SiO_2 \cdot 8H_2O$ |

A number of synthesis procedures for the preparation of crystalline aluminosilicates is known. In most instances the process is a continuous one involving a number of steps of varying complexity. In the crystalline aluminosilicate preparations of Barrer and his co-workers, aqueous mixtures of the preparations were evaporated to dryness over a steam table or in an air oven prior to crystalline formation. The dried material was hard and had to be ground to a powder to permit reconstitution. Reconstitution for completion of crystalline formation required the addition of water plus alkali. A new procedure for preparing a number of crystalline aluminosilicates which involves the recovery of an amorphous zeolite precursor in powdered form, said precursor being capable of isolation and storage in a dry, stable form for ultimate use in providing a variety of zeolites and which could be reconstituted merely by the addition of water, would offer significant advantages over processes presently employed.

SUMMARY OF THE INVENTION

Broadly this invention is directed to methods of preparing crystalline aluminosilicates which includes the formation of an amorphous precursor having a silica to alumina mole ratio substantially that of a Type 4A crystalline aluminosilicate. Further treatment of this amorphous precursor permits the preparation of a variety of crystalline aluminosilicates, including Type 3A, 4A, 5A, X and Y.

DESCRIPTION OF THE PREFERRED EMBODIMENTS

Broadly, we have found that an amorphous precursor for crystalline aluminosilicates can be prepared by forming a mixture in aqueous solution of the oxides, or of materials whose chemical compositions can be completely represented as mixturers of the oxides, $Na_2O$, $Al_2O_3$, $SiO_2$, and $H_2O$ in specified ranges of their mole ratios to produce, upon removal of water and drying, an amorphous powder having a silica to alumina mole ratio substantially that of a Type 4A zeolite. Reconstitution of the amorphous powder with water followed by aging and hydrothermal treatment will produce a Type 4A crystalline aluminosilicate. Alternately, ion exchanging the reconstituted amorphous powder with appropriate salts, followed by aging and hydrothermal treatment will yield Type 3A or 5A crystalline aluminosilicates. In a similar fashion reconstituting the amorphous powder with water and appropriate quantities of silicate ion will yield, following aging and appropriate hydrothermal treatment, Type X or Type Y crystalline aluminosilicates.

Initially, our invention is directed to a process for preparing an amorphous precursor for crystalline aluminosilicates which comprises:

(a) forming a sodium aluminum silicate water mixture having a composition in terms of oxide mole ratios of $Na_2O/SiO_2$ from 0.8 to 3.0, $H_2O/Na_2O$ from 35 to 200 and $SiO_2/Al_2O_3$ from 1.3 to 2.5;

(b) removing water from said mixture; and (c) drying the resultant material and recovering as an amorphous powder.

The amorphous precursor recovered from this process is a free flowing powder which can be stored until needed to prepare crystalline aluminosilicates. By appropriate washing, purification and recovery steps the amorphous powder may be obtained in a state of purity which, when processed in an appropriate manner, will yield crystalline aluminosilicates in a high degree of purity. This precursor offers the advantage of preparing a variety of crystalline aluminosilicates from a single starting material.

In preparing the precursor, known methods and formulations used to initiate the preparation of a Type 4A zeolite may be employed provided that the mole ratios of $Na_2O$, $Al_2O_3$, $SiO_2$ and $H_2O$ are within the ranges set forth above. Further, the procedure employed is one where the $Na_2O$, $Al_2O_3$ and $SiO_2$ species are present in the aqueous mixture and the crystallization of the 4A zeolite has not commenced. Briefly, we prepare an aqueous mixture of oxides which could, by subsequent treatment, yield a type 4A zeolite. However, we do not carry out the steps required to produce the crystalline zeolite but rather remove the water from the aqueous mixture of oxides and recover a dry amorphous powder having a silica to alumina mole ratio substantially that of a 4A zeolite which we then employ as a precursor for a number of zeolites.

Among the zeolite preparation techniques whose initial steps we may employ to prepare the amorphous precursor are those described in U.S. Pat. No. 2,847,280, issued to Estes, and U.S. Pat. No. 2,882,243, issued to Milton.

In one embodiment of our invention, based on the disclosure in the Estes patent, an aqueous mixture having the required composition is formulated by reacting an aqueous solution of sodium silicate with $CO_2$, $SO_2$, $H_2S$, the sodium hydrogen salts of their corresponding acids (i.e., sodium bicarbonate, sodium bisulfite and sodium hydrosulfide) or mixtures thereof to form hydrous silica and a by-product sodium salt and then adding sodium aluminate to the mixture in an amount sufficient to establish oxide mole ratios within the required ranges set forth above and particularly a silica to alumina mole ratio of about 2.

In preparing the amorphous precursor by this embodiment, the useful sodium silicate solutions employed are, broadly, 6.5 to 25% by weight solutions of sodium silicate in water having an equivalent $SiO_2$ concentration of about 5 to about 20 wt. %, and preferably about 10 wt. %. The latter solution is made by diluting one part by weight of commercial sodium silicate solution having an equivalent $SiO_2$ concentration of about 30 wt. % with two parts by weight of water.

To promote the formation of the silica gel, a source of acid such as $CO_2$, $SO_2$, $H_2S$, the sodium hydrogen salts of their corresponding acids and mixtures of the same is added. When gelation occurs the change is quite sudden and the treatment with the acidic material is discontinued. The acidic gas can be bubbled into the mixture or added as a liquid or solid. The preferred acidic gas is $CO_2$ added in the form of dry ice.

When the hydrous silica has been formed the required amount of sodium aluminate is added thereto. Although the sodium aluminate added can be substantially pure, a commercial grade can be employed but this often requires the incorporation of small quantities of free NaOH to aid solubility. To compensate for the solubilizing quantity of caustic soda added to the reaction mixture, it is necessary for the stoichiometry of the reaction to add additional hydrous alumina, which can be in the form of commercially available alumina sol or gel. The reactants are mixed at room temperature and a thick creamy reaction mixture is formed.

It is important that the quantities of reactants used are sufficient to establish the mole ratios of the oxides within the required ranges to produce the amorphous precursor. The molar excess of equivalent silica or alumina in the reaction mixture should not be substantially greater than 5 to 10%. Also the addition of the aluminate solution should be made as soon as possible after the formation of the silica gel.

In another embodiment based on a preferred procedure of the Milton patent, an aqueous solution of sodium aluminate and sodium hydroxide is combined with an aqueous solution of sodium silicate to produce a mixture in conformity with the mole ratio ranges set forth above. Prior to crystallization, which requires elevated temperatures for extended time, the amorphous precursor is recovered by removing water and drying the recovered solid yielding the required amorphous precursor.

After thoroughly mixing the aqueous mixture prepared by these embodiments and allowing sufficient time for equilibrium, the mixture is dehydrated to produce the amorphous precursor. One convenient means for removing the water is to extract the mixture with quantities of a water miscible solvent After permitting the mixture, together with the solvent, to stand, the precipitated amorphous material can be separated by filtration and then air dried to produce a free flowing powder. By extracting the dried material with additional quantities of solvent followed by filtration and drying, the moisture content of the powder can be reduced further.

Among the water miscible solvents which we find useful in this process are acetone, methyl ethyl ketone, methyl alcohol, ethyl alcohol, dimethyl sulfoxide and dimethyl formamide.

The amorphous precursor is recovered as a free flowing powder which can be maintained in a clean, dry condition until needed by storing in a closed vessel. By employing a sufficient number of solvent washings, the amorphous powder can be produced with a low water content and a high degree of purity.

The amorphous precursor can be utilized to prepare a variety of known crystalline aluminosilicates, including Type 4A, 3A, 5A, X or Y. To prepare a Type 4A zeolite, the amorphous precursor is reconstituted with sufficient quantities of water to produce a creamy suspension. This mixture must then be aged, i.e., allowed to stand at room temperature from 8 to 170 hours, and preferably from 24 to 72 hours at temperatures not substantially above about 100° F., but preferably at about room temperature. After aging, the reaction mixture is subjected to what is called a hydrothermal treatment by maintaining the mixture at a temperature of about 150°–325° F. and autogenous pressure for at least about three hours and preferably for about 4 to 24 hours. Preferably the reaction mixture is maintained between 220° and 280° F. for a period of 4 to 24 hours in a closed reactor whereby water vapors are confined and exert pressure. Although mechanical agitation during the hydrothermal treatment is preferred to obtain an extremely pure product, it is not essential and a satisfactory product can be made with little or no agitation.

Following the hydrothermal treatment, the type 4A zeolite in a hydrated form is present as a crystalline solid fraction and may be separated from the saline mother liquor by filtration. Other solid separation techniques, such as settling, centrifuging or the like, may also be used. The recovered solid can be washed with water or organic solvent such as acetone or alcohol to remove occluded foreign material. The recovered solid may then be air dried and removed as the hydrated zeolite. If desired, the hydrated form of the zeolite can be virtually dehydrated by calcining.

The amorphous precursor may be employed to prepare type 3A or type 5A zeolite by ion exchaning the water suspension of the amorphous precursor. To prepare a type 3A zeolite, the amorphous powder is exchanged with aqueous solutions of potassium salts which can replace the sodium ions with potassium ions to the extent of 90% or more. Among the potassium salts that may usefully be employed are those soluble salts which provide potassium ion on hydrolysis, for example, potassium chloride, potassium nitrate, potassium carbonate, potassium sulfate, potassium formate and potassium acetate. Following the ion exchange the suspension is subjected to the same aging, hydrothermal and recovery techniques as are used in preparing the type 4A zeolite described above.

In a similar fashion, a type 5A zeolite is prepared by exchanging the amorphous powder with aqueous solutions of calcium salts to the extent of replacing at least 40% of the sodium ions with calcium ions. Calcium salts that may usefully be employed are those soluble salts which provide calcium ion on hydrolysis, for example, calcium chloride, calcium nitrate, calcium sulfate, calcium formate and calcium acetate. Again, the aging, hydrothermal and recovery procedures employed to prepare the type 4A zeolite are used here to produce the type 5A zeolite.

The amorphous precursor may also be utilized to prepare a type X or type Y crystalline aluminosilicate. Following suspension of the amorphous powder in water, sources of silicate ion are added in sufficient quantities to achieve the silica to alumina ratio of the desired type X or type Y zeolite. We have found that aqueous solutions of sodium orthosilicate or ethyl silicate may be usefully employed for these purposes. In order to achieve the higher silica to alumina mole ratios required for the type X zeolite we have found that ratios in the mix as high as 8:1 may be necessary with a range of 2.2:1 to 8:1 being operable. Similarly, if the type Y zeolite is being prepared, the required silica to alumina ratio of 5:1 necessitates that the mole ratio in the mix be above 8:1 with a range of 8:1 to 15:1 being operable. Following the adjustment of the silica to alumina mole ratio to the required level, the preparation of the type X or type Y zeolites follows the same procedures as employed above for the type A zeolite, i.e., aging, hydrothermal treatment and recovery.

Those skilled in the art will appreciate that operating conditions utilized in the crystallization procedure, particularly, the time and temperature utilized in the hydrothermal treatment, may vary within the disclosed ranges but that the combination of conditions employed must be chosen so as to produce the desired crystalline product since it is possible that combinations of time and temperature at the extremes of the disclosed ranges may not produce the desired results or may do so only with difficulty or in limited yields of poor quality.

The following examples exemplify the practice of this invention.

EXAMPLE I 300 grams of sodium silicate were diluted to 600 cc. with water. Carbon dioxide in the form of dry ice was added in small pieces, a little at a time, and replenished at such a rate that no large excess was ever present. When a gel formed the last remaining bits of dry ice were removed. A solution of 150 grams of sodium aluminate ($2NaAlO_2 \cdot 3H_2O$) in 600 cc. of water was added with vigorous stirring to the silica gel. A smooth creamy mixture having a total volume of 1200 cc. was formed after about 10 minutes of stirring. 400 cc. of this mixture were set aside to age for comparison purposes and were labeled Sample A.

The remaining 800 cc. of mixture were poured with stirring into 1200 cc. of acetone. After standing for about 30 minutes the mixture was filtered. The solid cake was resuspended in 1000 cc. of acetone and allowed to stand for one hour before filtering and air drying of the solids. 247 grams of a solid material were recovered and labeled Sample B. Chemical analysis of Sample B showed 11.9 wt. % $SiO_2$, 15.8 wt. % $Al_2O_3$, 15.4 wt. % $Na_2O$ with the balance a mixture of water and acetone encapsulated in micells. An X-ray fraction pattern of Sample B revealed an amorphous structure plus sodium carbonate monohydrate. 50 grams of Sample B were suspended in 100 cc. of water in dialysis apparatus and the soluble salts were extracted for one week. 36 grams of material were recovered. X-ray diffraction analysis showed an amorphous structure and chemical analysis showed 24.9 wt. % $SiO_2$, 22.9 wt. % $Al_2O_3$, 14.7 wt. % $Na_2O$ with the balance being volatile.

EXAMPLE II

A portion of the Sample B dry gel was combined with ten times its weight of water in a two speed blender and mixed for about 10 minutes to reconstitute the gel. The reconstituted gel was then aged for a minimum of 24 hours. A 50 cc. portion of the aged reconstituted Sample B was placed in a closed vessel and maintained at 225° F. for 16 hours. In a similar fashion a 50 cc. portion of Sample A was given a similar hydrothermal treatment. At the end of this period the resultant crystalline fraction in each vessel was collected by filtration, washed with water to remove soluble salts and air dried. X-ray diffraction analysis identified the material from each vessel to be a 4A crystalline aluminosilicate. Analysis of a second portion of dry Sample B treated only by heating under the same conditions showed a mixture of hydroxysodatite, $Na_2CO_3.H_2O$, and unidentified species.

EXAMPLE III 30 grams of the dry amorphous gel (Sample B) were treated five times with a 1.0 molar potassium carbonate solution allowing 30 minutes contacting for each exchange. After final filtering and reconstituting with water, the mixture was aged for 24 hours at room temperature and then heated in a closed vessel at 225° F. for 16 hours. The resultant material was washed, filtered and dried. Chemical analysis of this product showed a sodium content of 0.68 wt. % and a potassium content of 26.7 wt. % The original gel had a sodium content of 26.5 wt. %. An X-ray diffraction pattern of the recovered material corresponded to that of a 3A($K^+$) zeolite.

EXAMPLE IV

Following the same procedure as was employed in Example III a one molar solution of calcium formate was used in ion exchange of a portion of Sample B. In this case analysis showed the product to have a sodium content of 0.74 wt. % and a calcium content of 14.3 wt. % (theoretical 14.1 wt. %). The X-ray diffraction pattern of the recovered material corresponded to that of a sample of 5A (Ca$^{++}$) crystalline aluminosilicate.

EXAMPLE V 15 grams of Sample B dry mix were reconstituted with 100 grams of sodium orthosilicate (Na$_4$SiO$_4$) in 150 cc. of water. The mixture was aged for 76 hours. The silica to alumina mole ratio in the dry mix was about 2:1. The addition of sodium orthosilicate was sufficient to raise this ratio to about 8:1. After aging, the mixture was subjected to hydrothermal treatment in a closed vessel at 225° F. for 16 hours as in the above examples. The resultant product was washed, dried and upon X-ray diffraction analysis showed a structure of type X crystalline aluminosilicate.

EXAMPLE VI

In a fashion similar to that of Example V, 5 grams of sodium orthosilicate were added to 10 grams of Sample B dry mix together with 100 cc. of water. To this mixture was added an additional source of silicate ion in the form of 20 grams of ethyl silicate. The resultant mixture was then aged for 76 hours. After hydrothermal treatment and recovery, the product exhibited a silica to alumina ratio of 3.5:1. X-ray diffraction pattern determinations confirmed the presence of type Y crystalline aluminosilicate.

EXAMPLE VII

This example demonstrates that an amorphous precursor cannot be prepared from an aqueous mixture used to initiate the preparation of a Type X zeolite.

205 grams of sodium silicate (containing 36.5% Na$_2$Si$_4$O$_9$) was diluted to 400 cc with distilled water. Carbon dioxide in the form of dry ice was added until incipient gelation occurred. The mixture was still fluid but flakes of gel were evident. 54.5 grams of sodium aluminate (2NaAlO$_2$.3H$_2$O) were dissolved in 400 cc of distilled water and added to the silicate solution with vigorous stirring. A thick gel was formed. 2200 cc of acetone were added with stirring and the mixture was allowed to stand for one hour, decanted and 200 cc of acetone were added again with stirring. After stirring for 30 minutes the material was filtered and air dryed. 186 grams were recovered as a gummy amorphous material. An X-ray diffraction of the gummy material showed an amorphous structure.

10 grams of this recovered material were reconstituted with water, allowed to age for a minimum of 24 hours and then placed in a closed vessel and maintained at 225° F. for 16 hours. At the end of this period the material therein was collected by filtration, washed with water to remove soluble salts and air dryed. X-ray diffraction analysis of the material showed an amorphous structure.

These examples demonstrate that an amorphous precursor having a silica to alumina mole ratio substantially that of a 4A zeolite may be prepared as a dry amorphous powder which upon reconstitution with water and subjection to aging and hydrothermal treatment will produce a zeolite 4A. Further, ion exchange of the amorphous powder with appropriate calcium and potassium salts followed by aging and hydrothermal treatment will yield zeolite 5A and zeolite 3A, respectively. In a similar fashion, adding appropriate quantities of silicate ion to aqueous solutions of the amorphous precursor followed by appropriate aging and hydrothermal treatment will produce zeolite X or zeolite Y depending upon the silicate additions.

Attempts to prepare an amorphous precursor from a mixture whose composition is other than that within the specified range for forming a zeolite A, such as, a mixture for producing zeolite X, results in a gummy amorphous material which is not only unsatisfactory for storage but which is unable to be utilized for the formation of crystalline aluminosilicates when reconstituted with water.

EXAMPLE VIII

This example demonstrates the results obtained when solvent drying of a synthesis mixture is utilized vis-a-vis the drying techniques employed in the prior art, such as those employed by Barrer and his co-workers. In J. Chem. Soc. 1561-57 (1952), Barrer and White prepared synthetic crystalline sodium aluminosilicates by hydrothermal procedures. The aqueous mixtures employed were evaporated to creamy consistency and though intermediate stages up to dryness over a steam bath or in an air oven at temperatures up to 120° C. Subsequent crystallization was difficult from those materials which were evaporated to dryness before hydrothermal treatment. The drying was counteracted through the use of alkali or hydrothermal crystallization at higher temperatures (above 350° C.).

A synthesis mixture was prepared as follows: 100 grams of PQN sodium silicate (8.7% Na$_2$O, 28.5% SiO$_2$) were diluted to 200 cc with distilled water and mixed with a solution prepared by diluting 144 g. of Nalco #2 aluminate (17.8% Na$_2$O, 20.6% Al$_2$O$_3$) to 200 cc. with distilled water. 20 cc. of concentrated HCl (12 normal) diluted to 100 cc with distilled water were then added and stirring continued for 20 minutes. The mole ratio of Al$_2$O$_3$:SiO$_2$:Na$_2$O in this mixture, on a buffered basis, was 1:1.63:1.1.

A blank run was made with this mixture to determine if it were satisfactory for purposes of the test. This blank run duplicated the procedure of our invention. A portion of the mixture was solvent dried with acetone, producing a dry material which was subjected to X-ray analysis and found to be amorphous. The dried material was then reconstituted with 10 parts of water, aged for 16 hours and hydrothermally treated at 108° C. for eight hours. The product obtained was subjected to X-ray analysis and identified as crystalline zeolite A.

Following the blank run, the remaining synthesis mixture was divided into three portions, labeled "C", "D" and "E" and a dried product was recovered from each portion by one of three drying techniques — solvent drying of the present invention, oven drying of the prior art or evaporation of the prior art. Portion C was solvent dried with acetone, Portion D was dried in an air oven at 120° C. and Portion E was dried on a steam bath. Each of the dried materials was then subjected to X-ray analysis. The "C" dried material was found to be amorphous. The "D" dried material was identified as incipient hydroxy sodalite plus a trace of zeolite A and the "E" dried material was identified as incipient hydroxy sodalite. These results are summarized in Table I, below:

| PORTION OF SYNTHESIS MIXTURE | DRYING METHOD | DRY MATERIAL (X-RAY ANALYSIS) |
|---|---|---|
| C | Acetone | Amorphous |
| D | Air Oven | Incipient Hydroxy Sodalite, trace Zeolite A |
| E | Steam Bath | Incipient Hydroxy Sodalite |

Each of the dried materials was then subjected to a variety of reconstitution, aging and hydrothermal conditions, ranging from fairly mild to rather severe in intensity. These procedures included:
(a) Reconstitution of one part of dried material to ten parts of water or with ten parts of one normal sodium hydroxide.
(b) Aging for 16 or 24 hours, and
(c) Hydrothermal treatment at
  (1) 108° C. for eight hours,
  (2) 150° C. for 36 hours, or
  (3) 350° C. for eight hours. Specifically, samples of the "C", "D" and "E" dried materials were treated as follows:
(a) Samples C-1, D-1 and E-1 were each reconstituted with ten parts of water, aged for 16 hours and hydrothermally treated at 108° C. for 8 hours. Each of the products was examined by X-ray. The C-1 product was identified as zeolite A while the D-1 and E-1 products were each identified as hydroxy sodalite.
(b) Samples C-2, D-2 and E-2 were each reconstituted with ten parts of water, aged for 24 hours and hydrothermally treated at 150° C. for 36 hours. In each instance the product obtained was identified as hydroxy sodalite by X-ray analysis.
(c) Samples C-3, D-3 and E-3 were each reconstituted with 10 parts of water, aged for 24 hours and hydrothermally treated at 350° C. for eight hours. In each instance the product obtained was identified as sodalite by X-ray analysis.
(d) Samples C-4, D-4 and E-4 were each reconstituted with 10 parts of one normal sodium hydroxide solution, aged for 24 hours and hydrothermally treated at 150° C. for 36 hours. In each instance the product obtained was identified as hydroxy sodalite by X-ray analysis.

These tests are summarized in Table II.

TABLE II

| Dry Sample | Reconstitution Procedure | Aging Hr | Hydrothermal °C. (°F.) | Hr | Product (X-ray Analysis) |
|---|---|---|---|---|---|
| C-1 | 1:10 Water | 16 | 108 (226.4) | 8 | Zeolite A |
| D-1 | 1:10 Water | 16 | 108 | 8 | Hydroxy Sodalite |
| E-1 | 1:10 Water | 16 | 108 | 8 | Hydroxy Sodalite |
| C-2 | 1:10 Water | 24 | 150 (302) | 36 | Hydroxy Sodalite |
| D-2 | 1:10 Water | 24 | | | |
| E-2 | 1:10 Water | 24 | 150 | 36 | Hydroxy Sodalite |
| C-3 | 1:10 Water | 24 | 350 (662) | 8 | Sodalite |
| D-3 | 1:10 Water | 24 | 350 | 8 | Sodalite |
| E-3 | 1:10 Water | 24 | 350 | 8 | Sodalite |
| C-4 | 1:10 1N NaOH | 24 | 150 (302) | 36 | Hydroxy Sodalite |
| D-4 | 1:10 1N NaOH | 24 | 150 | 36 | Hydroxy Sodalite |
| E-4 | 1:10 1N NaOH | 24 | 150 | 36 | Hydroxy Sodalite |

"C" samples — Acetone dried
"D" samples — Oven dried
"E" samples — Steam bath dried Initially, this example shows that if a zeolite A synthesis mixture is subjected to a variety of drying procedures, the nature of the dried product will vary. Thus, with the acetone drying we employ, an amorphous product is produced (Sample C). The oven drying and steam bath drying of Barrer and his co-worker produced a crystalline product of incipient hydroxy sodalite, plus, in the oven dried material, a trace of zeolite A (Samples D & E).

Further, this example demonstrates that the specific drying technique employed to produce a dried product from a zeolite A synthesis mixture can influence the nature of a crystalline product produced when the dried material is subjected to known crystallization procedures. In addition, the nature of the final crystaline product can also be influenced by the severity of the crystallization procedure employed. Specifically, if a zeolite A synthesis mixture is subjected to solvent drying and mild reconstitution, aging and hydrothermal procedures in accordance with our invention, a zeolite A is produced (Sample C-1). On the other hand, if this same synthesis mixture is subjected to the oven drying or steam-bath drying of Barrer and his co-workers and the same mild crystallization procedures, a more stable form of aluminum silicate, hydroxy sodalite, is obtained (Samples D-1 & E-1). Longer aging coupled with mildly severe hydrothermal procedures produce hydroxy sodalite despite the drying procedure used (Samples C-2, D-2 & E-2).

The severe hydrothermal conditions of Barrer et al as well as their caustic reconstitution procedure produce either sodalite or hydroxy sodalite regardless of the drying techniques employed (Samples C-3, D-3 & E-3; C-4, D-4 & E-4.

It should be pointed out that in Example VIII although the solvent dried material produced zeolite A with mild hydrothermal conditions of 108° C. (226.4° F.) for 8 hours (Sample C-1), more severe conditions of 150° C. (302° F.) for 36 hours failed to produce the zeolite (Sample C-2) despite the fact that both sets of conditions are within the broad, although not the preferred, operating conditions of our process. As discussed hereinbefore, we use hydrothermal conditions of a 150°–325° F. temperature for at least 3 hours, preferably 4 to 24 hours, but we prefer 220°–280° F. for 4 to 24 hours. By way of explanation, it would appear that because of the combination of higher temperature and longer time employed with Sample C-2, any zeolite A (which is metastable) which may have formed could have been transformed into the more stable hydroxy sodalite.

Obviously, many modifications and variations of our invention as hereinbefore set forth may be made without departing from the spirit and scope thereof. Therefore only such limitations should be imposed as are indicated in the following claims.

We claim:

1. A process for preparing an amorphous precursor for crystalline aluminosilicates which comprises:
   (a) forming under ambient conditions a sodium aluminum silicate water mixture sufficient for the formation a type 4A zeolite and having a composition, in terms of oxide mole ratios, of $Na_2O/SiO_2$ from 0.8 to 3.0, $H_2O/Na_2O$ from 35 to 200 and $SiO_2/Al_2O_3$ from 1.3 to 2.5;
   (b) removing water from said mixture by extracting the mixture with a water miscible solvent;
   (c) recovering the resultant solid material; and
   (d) drying the resultant material to produce an amorphous powder.

2. A process according to claim 1 wherein the water miscible solvent is selected from the group consisting of acetone, methyl ethyl ketone, methyl alcohol, ethyl alcohol, dimethyl sulfoxide and dimethyl formamide.

3. A process according to claim 2 wherein the solvent is acetone.

4. A process according to claim 1 wherein the mixture in step (a) is formed by reacting an aqueous solution of sodium silicate with a material selected from the group consisting of $CO_2$, $SO_2$, $H_2S$, a sodium hydrogen salt of a corresponding acid or a mixture thereof, and then adding sodium aluminate to the resulting hydrous silica.

5. A process according to claim 4 wherein $CO_2$ is added in the form of dry ice.

6. A process according to claim 1 wherein the mixture in step (a) is formed by combining an aqueous solution of sodium aluminate and sodium hydroxide with an aqueous solution of sodium silicate.

7. An amorphous precursor for crystalline aluminosilicates prepared by the method of claim 1.

8. A process for preparing a Type 4A crystalline aluminosilicate which comprises:
   (a) admixing the amorphous precursor of claim 7 with water to provide a homogenous mixture;
   (b) aging the mixture for 8–170 hours at a temperature not substantially above about 100° F.;
   (c) maintaining the aged mixture under autogenous pressure and a temperature of 150°–325° F. for at least about three hours to form type 4A crystalline aluminosilicate; and
   (d) recovering a type 4A crystalline aluminosilicate as a resulting solid fraction.

9. A process according to claim 8 wherein the conditions of step (b) are room temperature for about 24–72 hours and the conditions of step (c) are 220°–280° F. for about 4–24 hours.

10. A process for preparing a type 3A crystalline aluminosilicate which comprises:
    (a) admixing the amorphous precursor of claim 7 with an aqueous solution of a soluble potassium salt;
    (b) removing said aqueous solution from said precursor;
    (c) contacting said precursor with additional quantities of said aqueous solution until 90% of the sodium ions are replaced with potassium ions;
    (d) aging a mixture of water and said treated precursor for 8–170 hours at a temperature not substantially above about 100° F.;
    (e) maintaining the aged mixture under autogenous pressure at a temperature of 150°–325° F. for at least about three hours to form type 3A crystalline aluminosilicate; and
    (f) recovering type 3A crystalline aluminosilicate as a resulting solid fraction.

11. A process according to claim 10 wherein the conditions of step (d) are room temperature for about 24–72 hours and the conditions of step (e) are 220°–280° F. for about 4–24 hours.

12. A process for preparing a type 5A crystalline aluminosilicate which comprises:
    (a) admixing the amorphous precursor of claim 7 with an aqueous solution of a soluble calcium salt;
    (b) removing said aqueous solution from said precursor;
    (c) contacting said precursor with additional quantities of said aqueous solution until at least 40% of the sodium ions are replaced with calcium ions;
    (d) aging a mixture of water and said treated precursor for 8–170 hours at a temperature not substantially above about 100° F.;
    (e) maintaining the aged mixture under autogenous pressure and a temperature of 150°–325° F. for at least about three hours to form type 5A crystalline aluminosilicate; and
    (f) recovering type 5A crystalline aluminosilicate as a resulting solid fraction.

13. A process according to claim 12 wherein the conditions of step (d) are room temperature for about 24–72 hours and the conditions of step (e) are 220°–280° F. for about 4–24 hours.

14. A process of preparing a type X crystalline aluminosilicate which comprises:
    (a) admixing the amorphous precursor of claim 7 with water to form a homogenous mixture;
    (b) adding to said mixture a source of silicate ion in an amount sufficient to establish in said mixture a silica to alumina mole ratio of between 2.2:1 and 8:1
    (c) aging the resultant mixture for 8–170 hours at a temperature not substantially above about 100° F.;
    (d) maintaining the aged mixture under autogenous pressure and a temperature of 150°–325° F. for at least about three hours to form type X crystalline aluminosilicate; and
    (e) recovering type X crystalline aluminosilicate as a resulting solid fraction.

15. A process according to claim 14 wherein the conditions of step (c) are room temperature for about 24–72 hours and the conditions of step (d) are 220°–280° F. for about 4–24 hours.

16. A process of preparing a type Y crystalline aluminosilicate which comprises:
    (a) admixing the amorphous precursor of claim 7 with water to form a homogenous mixture;
    (b) adding to said mixture a source of silicate ion in an amount sufficient to establish in said mixture a silica to alumina mole ratio of between 8:1 and 15:1;
    (c) aging the resultant mixture for 8–170 hours at a temperature not substantially above about 100° F.;
    (d) maintaining the aged mixture under autogenous pressure and a temperature of 150°–325° F. for at least about three hours to form type Y crystalline aluminosilicate; and
    (e) recovering type Y crystalline aluminosilicate as a resulting solid fraction.

17. A process according to claim 16 wherein the conditions of step (c) are room temperature for about 24–72 hours and the conditions of step (d) are 220°–280° F. for about 4–24 hours.

* * * * *